Figure 1:
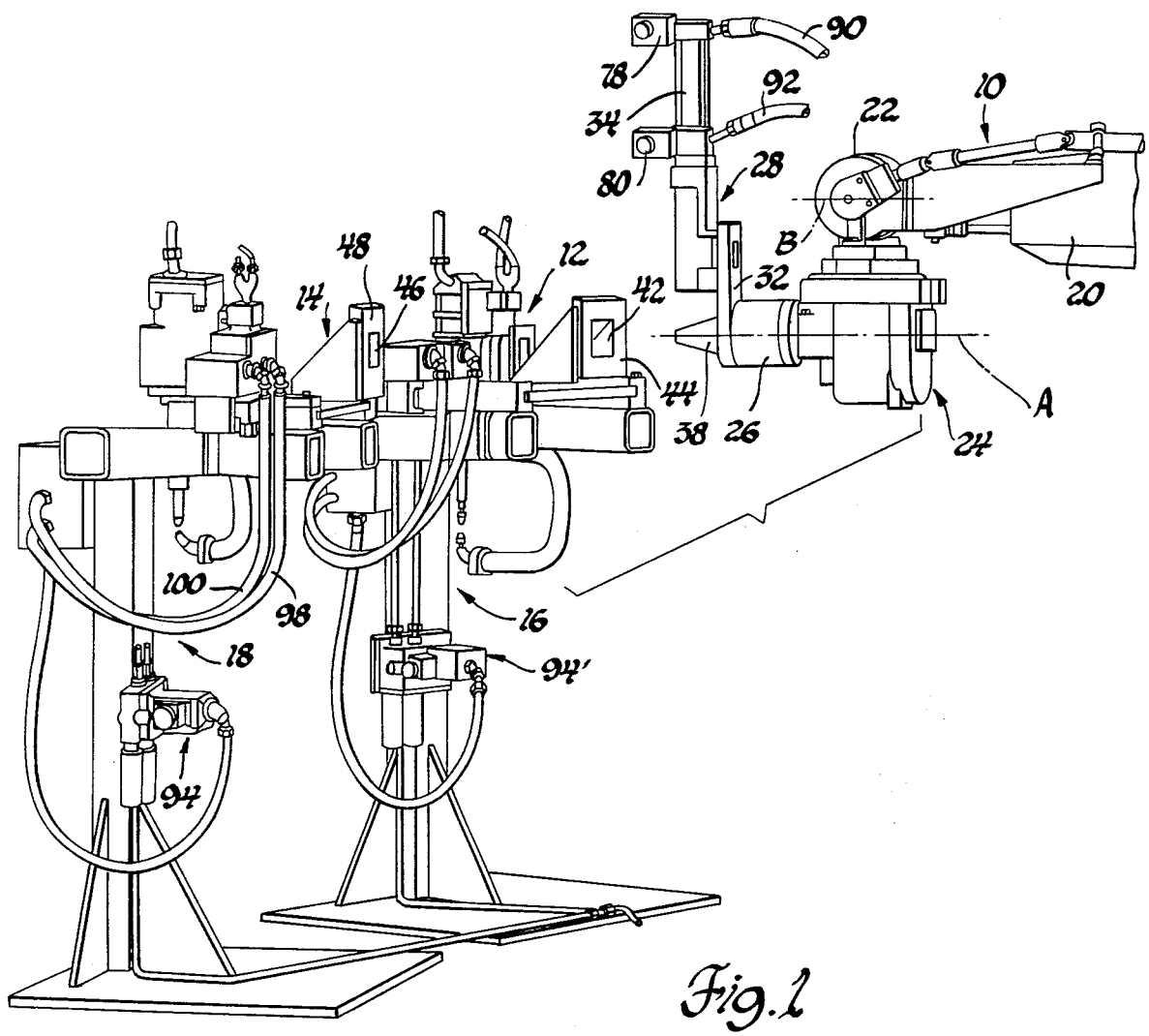

United States Patent [19]

Cwycyshyn et al.

[11] 4,046,263

[45] Sept. 6, 1977

[54] TOOL CHANGING APPARATUS FOR A MULTI-AXIS MANIPULATOR

[75] Inventors: Walter Cwycyshyn, Detroit; Floyd M. Holroyd, Farmington Hills, both of Mich.

[73] Assignee: General Motors Corporation, Detroit, Mich.

[21] Appl. No.: 709,800

[22] Filed: July 29, 1976

[51] Int. Cl.² .............................................. B23K 9/12
[52] U.S. Cl. ................................. 214/1 BC; 29/26 A;
214/1 BD; 214/145 A; 214/147 T; 228/45
[58] Field of Search ............................ 228/25, 32, 45;
214/1 B, 1 BB, 1 BC, 1 BD, 147 T, 1 CM, 145 A; 29/26 A

[56] References Cited

U.S. PATENT DOCUMENTS

| 3,128,645 | 4/1964 | Anthony | 77/5 |
|---|---|---|---|
| 3,161,428 | 12/1964 | Zook | 292/292 |
| 3,281,934 | 11/1966 | Lehmkuhl | 29/568 |
| 3,526,033 | 9/1970 | Saunders | 29/568 |
| 3,665,148 | 5/1972 | Yasenchak | 228/45 X |
| 3,684,101 | 8/1972 | Bradford | 211/1.5 |
| 3,934,738 | 1/1976 | Arnold | 214/145 A |

*Primary Examiner*—Robert J. Spar
*Assistant Examiner*—George F. Abraham
*Attorney, Agent, or Firm*—Edward J. Biskup

[57] ABSTRACT

Tool changing apparatus for a multi-axis manipulator for selectively receiving and holding one of at least two different work tools. Each of the work tools is mounted on an upstanding table and is provided with a substantially vertical plate and a substantially horizontal plate. A support assembly is provided on the manipulator that is adapted to be locked to the vertical plate on one of the work tools for performing a programmed work cycle after which the work tool is returned and deposited on the upstanding table under program control and the manipulator is then locked to the vertical plate of the other work tool for performing additional operations.

3 Claims, 7 Drawing Figures

TOOL CHANGING APPARATUS FOR A MULTI-AXIS MANIPULATOR

The invention concerns a program-controlled multi-axis manipulator and more particularly a tool changing apparatus for such a manipulator for selectively receiving and holding one of at least two different work tools.

At the present time, spot welding guns are bolted to the working end of program-controlled manipulators and have to be changed manually. Such changes are usually made at the end of a production run or in instances where a repair has to be made. As a result, each manipulator can only be operated with one particular spot welding gun, and in most cases, because of the geometry of the parts being spot welded, the welding gun selected is a compromise so as to satisfy the worst welding condition.

As should be apparent from the above, there is a need to provide an automatic method for changing welding guns and other tools that can be utilized with program-controlled manipulators so that the proper tool will be utilized for a given part and thereby provide improved product quality.

Accordingly, the objectives of the present invention are to provide a new and improved tool changing apparatus for use with a multi-axis manipulator that has a support assembly for receiving and holding a work tool; to provide an improved tool changing arrangement that allows a manipulator to selectively move a support assembly horizontally into locking engagement with a plurality of work tools which, when not in use, are supported at predetermined positions by one or more tables; to provide an improved tool changer device for a multi-axis manipulator that provides a positive locking arrangement between the work tool and the support assembly of the manipulator so as to allow the work tool to perform operations in various positions; and to provide an improved tool changing apparatus for a program-controlled manipulator that includes a control system for sensing when the manipulator is locked to a selected work tool and when the work tool has been returned to and deposited on a support stand preparatory to selecting another work tool.

In the preferred form, the tool changing apparatus, according to the invention, includes a support assembly which is part of the working end of a program-controlled multi-axis manipulator. The support assembly is connected to the usual wrist assembly of the manipulator that includes a gear unit for pivoting a carrier about a horizontal axis and rotating an output shaft about an axis lying in a vertical plane. The support assembly is adapted to selectively carry one of two or more work tools, each of which is formed with an upstanding plate that has an aperture formed therein defined by a plurality of straight sides in converging planes. The support assembly has a mounting member connected to the output shaft of the manipulator that includes a pyramid-like projection formed with a slot. The projection has a plurality of converging sides corresponding to the number of sides in the aperture and is adapted to mate therewith after which a linear actuator fixed to the mounting member serves to extend a wedge member into the slot for clamping the upstanding plate to the mounting member. After the work cycle is completed with the particular work tool, the manipulator is then positioned under program control adjacent a table which serves as a receiving station for the work tool. When the work tool is properly positioned on the table, the wedge member is retracted from the slot and the support assembly is withdrawn and if the program so requires, moves to a position adjacent another work tool for connection therewith.

Figure 2:
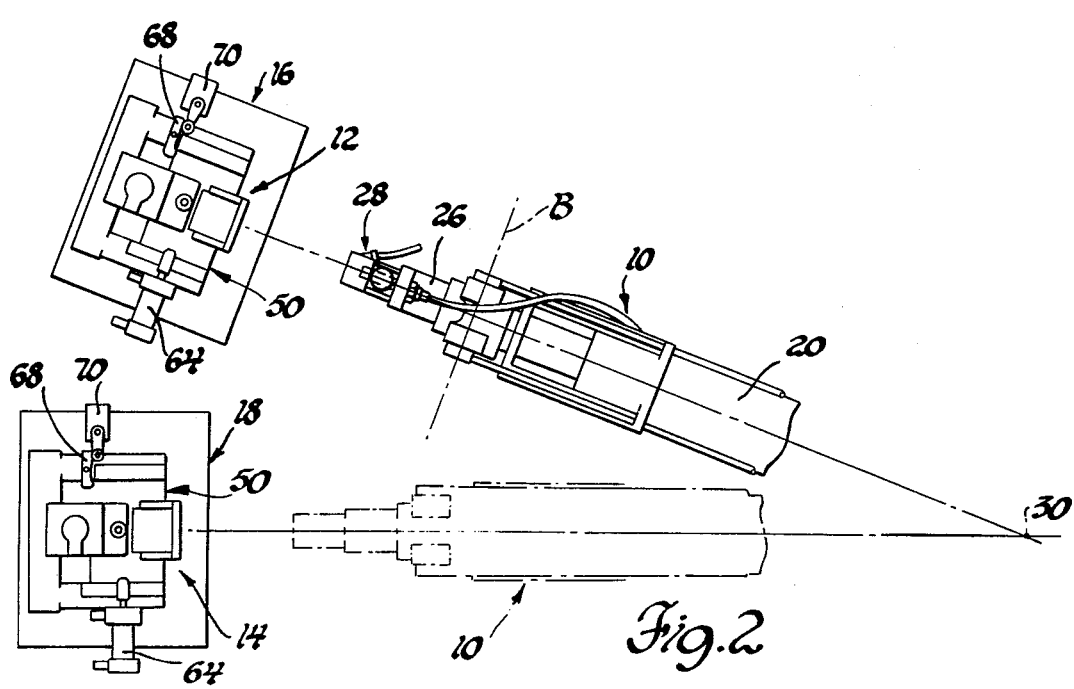
Figure 3:
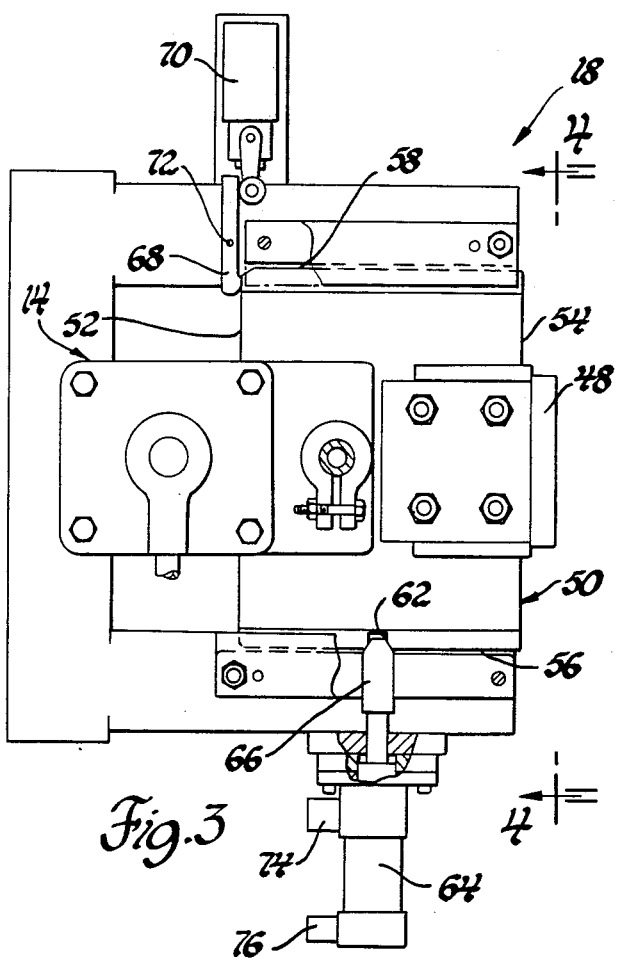
Figure 4:
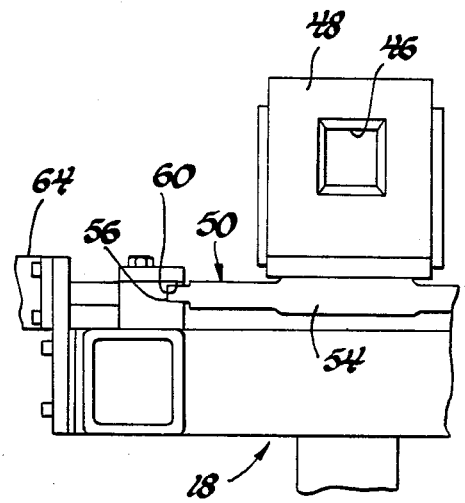
Figure 5:
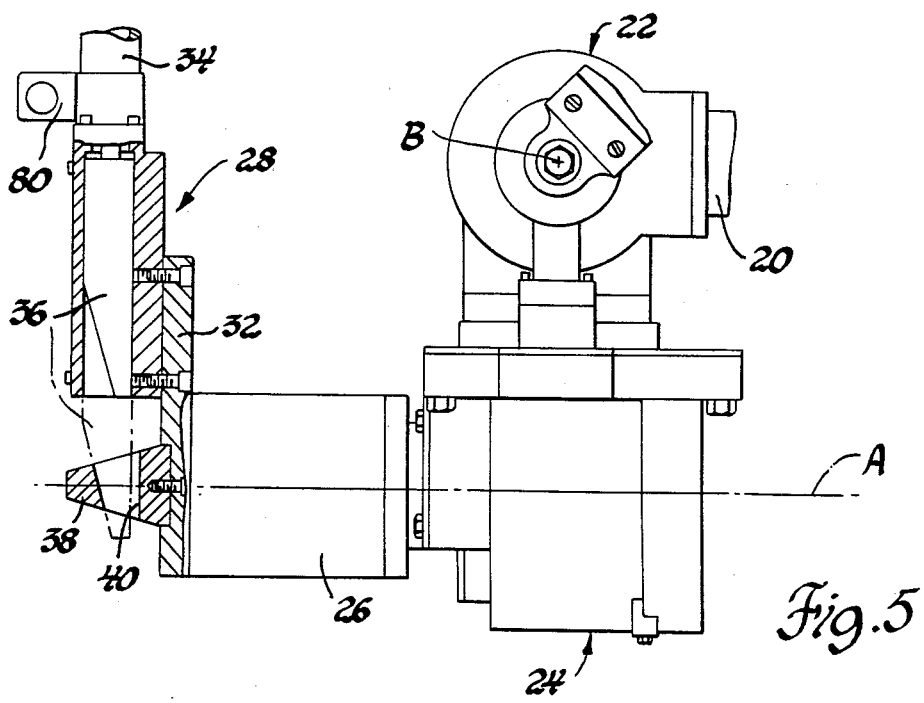
Figure 6:
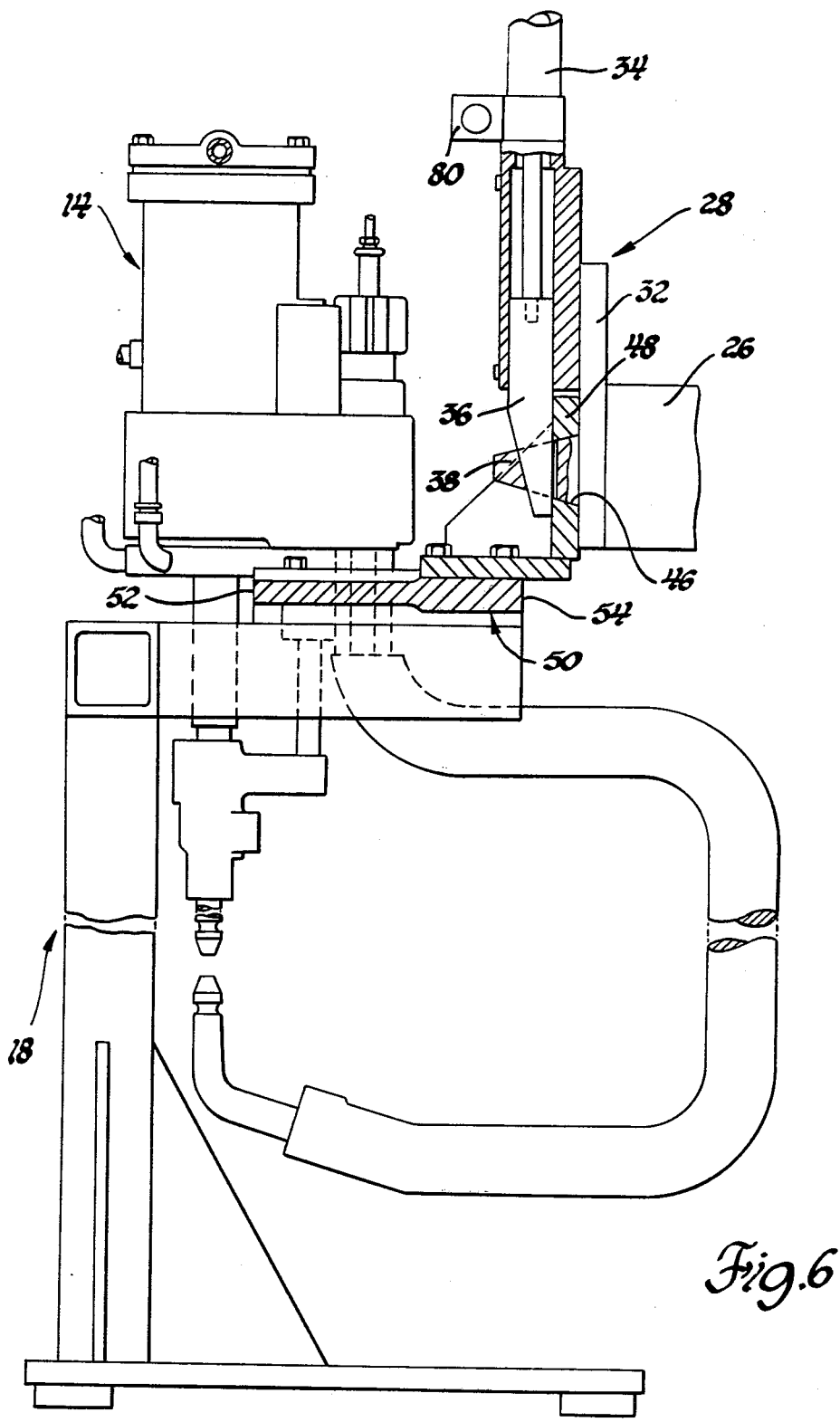
Figure 7:
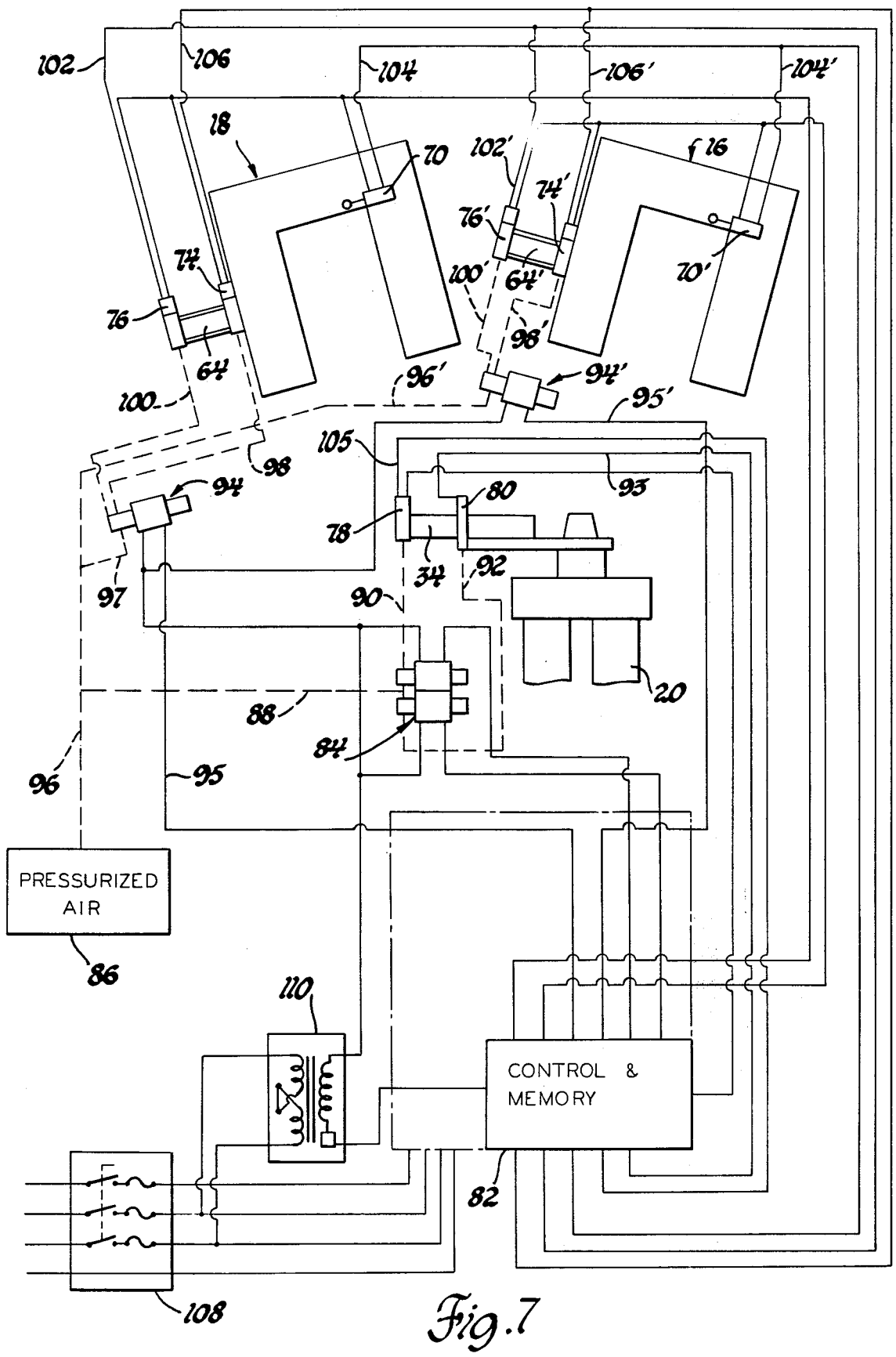

A more complete understanding of the present invention will be derived from the following detailed description when taken with the drawings in which:

FIG. 1 is a perspective view showing the work end of a program-controlled manipulator located adjacent two support tables each having a work tool positioned thereon, FIG. 2 is a plan view showing the manipulator and two support tables of FIG. 1, FIG. 3 is an enlarged plan view showing one of the tables disclosed in FIGS. 1 and 2, FIG. 4 is an end view taken on line 4—4 of FIG. 3 and shows the upstanding plate that forms a part of the work tool, FIG. 5 is an enlarged view showing the support assembly incorporated with the work end of the manipulator seen in FIGS. 1 and 2, FIG. 6 is an enlarged elevational view showing one of the support tables seen in FIGS. 1 and 2 with the support assembly of the manipulator attached to the work tool and, FIG. 7 is a schematic diagram showing the air and electric circuit incorporated with the support tables and the support assembly connected to the manipulator.

Referring to FIGS. 1 and 2 of the drawings, a portion of a multi-axis manipulator 10 is shown which is suitable for program-controlled movement to achieve universal work processing relationship with respect to parts such as the two spot welders 12 and 14 respectively mounted on support tables 16 and 18. The manipulator 10 includes an elongated support arm 20 which has the rear end thereof mounted on a pedestal type base (not shown) that extends into a housing. The housing includes the usual controls for automatically causing the work end of the manipulator 10 to move along various axes under the control of a program. A manipulator of this type with all of the mechanical parts that provide the requisite movement of the work end thereof can be seen in copending patent application Ser. No. 644,177, entitled "Article Gripper Mounting Device," filed on Dec. 24, 1975, now U.S. Pat. No. 3,984,009, and assigned to the assignee of this invention and reference is made thereto for a full understanding of the operation of the manipulator.

More specifically, and as seen in FIG. 1, the support arm 20 of the manipulator 10 includes a wrist assembly 22 which is connected with a gear box 24 provided with a rotatable output shaft 26 which in turn carries a support assembly 28. The support assembly 28 is adapted to be connected to a work tool such as one of the spot welders 12 and 14 supported by the tables 16 and 18 which are spaced from each other and positioned along an arc having its center coinciding with the vertical axis 30 about which the support arm 20 is rotatable. Thus, as will be more apparent as description of the invention proceeds, when the program calls for the manipulator 10 to change tools, the support assembly 28 will be positioned at a predetermined point in space so that extensible movement of the arm 20 will permit the connected work tool to be repositioned on a support table and released from the support assembly 28, after which the arm 20 will be withdrawn horizontally and moved into position for connection with the other work tool for withdrawal thereof from its support table so that the manipulator 10 can continue its work cycle with the other tool under program control.

As is customary with manipulators of the type described above and seen in FIG. 1, the wrist assembly 22 includes a differential gear unit, which, in this case, drives appropriate gearing in the box 24 so as to cause rotation of the output shaft 26 and the connected support assembly 28 about an axis indicated by the letter "A". The axis "A" is coaxial with the longitudinal center axis of the output shaft 26 which takes the form of a cylindrical member that is fixed with the support assembly 28.

The support assembly 28 includes a mounting member 32 that serves as a support for an air cylinder 34, the piston rod of which is rigidly connected with a wedge member 36 that is movable between the full line and phantom line positions shown in FIG. 5. In addition, the mounting member 32 serves as a support for a pyramid-like projection 38 which is formed with four converging sides. The projection 38 has an aperture 40 that is adapted to receive the wedge member 36 when the latter is located in the phantom line position of FIG. 5. The longitudinal center axis of projection 38 is coaxial with axis "A" and the projection 38 is adapted to extend into an opening 42 having four tapered or converging side walls formed in an upstanding plate 44 rigid with the spot welder 12. An identical opening 46 is formed in an upstanding plate 48 rigid with the spot welder 14.

It will be understood that the spot welding guns 12 and 14 are of different size and each is mounted on and secured to a rectangular base plate 50 which is fixed with the associated upstanding plate and has a front edge 52, rear edge 54 and side edges 56 and 58. As seen in FIGS. 3 and 4, the full length of each side edge 56 and 58 of the base plate 50 is formed with a reduced section that is adapted to extend into a correspondingly shaped longitudinally extending slot 60 located in the upper portion of each support table 16 and 18. The reduced section of side edge 56 intermediate the ends thereof has a notch 62 formed therein so when the spot welding gun is positioned in the support table 18 as seen in FIG. 3, an air cylinder 64 mounted to one side of the support table serves to insert a shot pin 66 into the notch 60 for locking the base plate 50 to the support table. On the opposite side of the support table, a lever 68 and limit switch 70 are provided for sensing the position of the front edge 52 of the base plate 50 when in the support table. Thus, when the spot welding gun is properly returned to the support table, the front edge 52 of the base plate 50 will engage the lever 68 and cause it to pivot about its pivotal connection 72 and cause closing movement of the limit switch 70. Each of the air cylinders 64 associated with the support tables 16 and 18 is provided with position sensing limit switches 74 and 76 located at the opposite ends of the cylinder. In this manner, when the shot pin 66 is extended outwardly or when it is retracted, a limit switch is closed and an output signal is given to the control system of the manipulator indicating the position of the shot pin 66. It will be noted that air cylinder 34 also is provided with limit switches 78 and 80 which similarly serve to indicate the position of the piston thereof and accordingly the wedge member 36.

The operation of the above described tool changing apparatus is as follows: As seen in FIGS. 1 and 2 and with reference to FIG. 7, it can be assumed that the manipulator 10 has completed its work cycle with the spot welding gun 12 and has deposited the latter gun on the support table 16 and withdrawn horizontally therefrom. At this point, the control and memory system 82 of the manipulator 10 will cause the arm 20 to rotate about the axis 30 to the phantom line position for receiving the spot welding gun 14. Upon command, the arm 20 will be extended longitudinally so as to cause the projection 38 to move into the opening 46 formed in the plate 48. Afterwards, the control system will then provide a command signal which will cause a solenoid operated valve 84 to be actuated so as to direct pressurized air from a source 86 to the upper end of the air cylinder 34 via lines 88 and 90 while at the same time exhausting air from the lower end of the cylinder via line 92 and the valve 84. As a result, the air cylinder 34 is actuated causing the wedge member 36 to move to the full line position of FIG. 6, so as to lock the plate 48 to the support assembly 28. In this regard, it will be noted that the wedge member 36 is designed so as to cause the outer surface thereof to contact the inclined surface of the aperture 40 and to cause the inner surface thereof to engage the plate 48. Thus, the plate 48 is drawn towards the mounting member 32 and firmly seated thereagainst.

Upon rigid connection with the spot welding gun 14 as described above, the limit switch 80 associated with the air cylinder 34 will provide an output signal via conductor 93 to the control and memory system 82 indicating that the wedge member 36 has been inserted into the aperture 40 of the projection 38. The control system 82 will then produce a command signal to a solenoid operated valve 94 by way of conductor 95 causing the valve to direct pressurized air via lines 96, 97 and 98 to the head end of the air cylinder 64 of support table 18 while simultaneously venting the base end of the air cylinder 64 via line 100 and the valve 94 to atmosphere. This causes the shot pin 66 to be retracted, at which time an output signal is generated by the limit switch 76 through conductor 102 indicating to the control system 82 that such action has been taken. Thereupon, the control system 82 causes the arm 20 of the manipulator to be retracted horizontally causing the spot welding gun 14 to be withdrawn from the support table 18. The manipulator 10 then performs the work which it has been programmed to do with the spot welding gun 14.

Upon completion of the work called for by the control and memory system 82, the manipulator 10, if directed to do so by the program, will once again assume the phantom line position of FIG. 2 in line with the support table 18 for reinserting the spot welding gun 14 into the support table 18. On command, the arm 20 will be extended horizontally to cause the side edges 56 and 58 of base plate 50 to move within the guide slots 60 of the support table 18. Movement of the spot welding gun 14 will continue until it reaches a programmed position, at which time the lever 68 is engaged so as to close the limit switch 70, which will then provide an output signal through conductor 104 to the control system 82 indicating that the spot welding gun 14 is in the proper rest position. After this signal is received by the control system 82, the latter then provides a command signal deenergizing solenoid valve 94 via so as to direct pressurized air to the base end of the air cylinder 64 line 100 while venting the opposite end of the cylinder via line 98. This causes the shot pin 66 to be extended into the notch 62 and also causes the limit switch 74 to be closed and limit switch 76 to be opened. Limit switch 74 will then provide an output signal by way of conductor 106 to the control system 82 indicating that the base plate 50 is locked in position in the support table 18. Thereupon, the control system 82 will deenergize the solenoid operated valve 84 so that pressurized air is directed to the head end of air cylinder 34 via line 92 while the base end of the air cylinder is vented via line 90 and the valve 84. This will cause the wedge member 36 to be retracted from the aperture 40 in the projection 38. The limit switch 78 will then be closed and provide a signal via conductor 105 to the control system 82 that the wedge member 36 has been removed from the projection 38, whereupon the arm 20 of the manipulator will then be withdrawn from the plate 48 of the spot welding gun 14 and if commanded to do so, move to the full line position of FIG. 2 to receive the spot welding gun 12 to perform additional work.

In this regard, it will be noted that the support table 16 includes the same parts as the support table 18 and the corresponding parts are identified by the same reference numerals but primed. Also, the valve 94', air cylinder 64', limit switches 70', 74', 76' will function in the same manner as explained in connection with the corresponding parts of support table 18 when the projection 38 is inserted into opening 42 of plate 44 for receiving the spot welding gun 12.

It will also be noted that the interface connection between the solenoid-operated valves, limit switches, air cylinders and the control and memory system of the manipulator so as to realize an operating tool changing apparatus as described above was done using a Unimate Robot Series 2000B manufactured by Unimation of Danbury, Conn. and having a sixth degree hand gear train arrangement. As seen in FIG. 7, the Unimate had a three phase power supply 108 of 440 volts and inasmuch as the solenoid valves utilized for selectively directing pressurized air to the air cylinders operated on 110 volt power supply, a step-down transformer 110 was utilized for supplying the single phase power to the solenoid valves.

Various changes and modifications can be made in this construction without departing from the spirit of the invention. Such changes and modifications are contemplated by the inventors and they do not wish to be limited except by the scope of the appended claims.

We claim:

1. A support assembly for a work tool that is movable by a multi-axis manipulator having an elongated arm provided with a wrist assembly that includes a gear unit that serves to pivot a carrier about a horizontal axis and rotate an output shaft about an axis lying in a vertical plane passing through the longitudinal axis of said arm, the work tool having an upstanding plate member secured thereto, said support assembly including a mounting plate member connected to said output shaft, one of said plate members formed with an aperture defined by a plurality of straight sides lying in converging planes, the other of said plate members being formed with a tapered projection having a slot therein, said tapered projection capable of projecting through said aperture and having a plurality of sides corresponding to the number of sides in said aperture with a portion thereof adapted to mate therewith, an actuator fixedly attached to said mounting plate member, and a wedge member carried by said actuator and movable thereby into said slot formed in a portion of the tapered projection which has passed through the aperture for clamping the upstanding plate of the work tool to the mounting plate member after the tapered projection is projecting through the aperture.

2. A support assembly for a work tool that is movable by a multi-axis manipulator having an elongated arm provided with a wrist assembly that includes a gear unit that serves to pivot a carrier about a horizontal axis and rotate an output shaft about an axis lying in a vertical plane passing through the longitudinal axis of said arm, the work tool having an upstanding plate secured thereto and formed with an aperture defined by a plurality of straight sides lying in converging planes, said support assembly including a mounting member connected to said output shaft and terminating with a tapered projection having a slot formed therein, said tapered projection capable of projecting through said aperture and having a plurality of sides corresponding to the number of sides in said aperture with a portion thereof adapted to mate therewith, a linear actuator fixedly attached to said mounting member above said tapered projection, and a wedge member carried by said actuator and movable thereby into said slot formed in a portion of the tapered projection which has passed through said aperture for clamping the upstanding plate of the work tool to the mounting member after the tapered projection is rejecting through the aperture.

3. A tool changing apparatus for a multi-axis manipulator having an elongated arm provided with a gear unit that serves to pivot a carrier about a horizontal axis and rotate an output shaft about an axis lying in a vertical plane passing through the longitudinal axis of said arm, a support assembly connected to said output shaft and adapted to be selectively connected to a work tool fixed with a pair of angularly related plate members, one of said plate members having an aperture formed therein defined by a plurality of straight sides lying in converging planes, a table adapted to receive the other of said plate members for holding the work tool in a predetermined position relative to said manipulator prior to connection with said support assembly, said support assembly including a mounting member connected to said output shaft and terminating with a tapered projection having a slot formed therein, said tapered projection having a plurality of sides corresponding to the number of sides in said aperture and adapted to project through and having a portion thereof to mate with the sides of said aperture, a linear actuator fixedly attached to said mounting member above said tapered projection, a wedge member carried by said actuator and movable thereby into said slot formed in the portion of the tapered projection projecting beyond said aperture for clamping said one of said plate members of the work tool to the mounting member after the tapered projection is projecting through the aperture, and means carried by said table and said support assembly for providing an output signal when said work tool is positioned on said table and when the work tool is connected to said support assembly.

* * * * *